(12) United States Patent
Chng et al.

(10) Patent No.: US 8,607,021 B2
(45) Date of Patent: Dec. 10, 2013

(54) METHOD AND DATA STORAGE SYSTEM FOR PROVIDING MULTIPLE PARTITION SUPPORT

(75) Inventors: YongPeng Chng, Singapore (SG); LianYong Tan, Singapore (SG); YamPheng Tham, Singapore (SG); HuaYuan Chen, Singapore (SG); Wesley WingHung Chan, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/538,479

(22) Filed: Jun. 29, 2012

(65) Prior Publication Data

US 2012/0271994 A1    Oct. 25, 2012

Related U.S. Application Data

(63) Continuation of application No. 10/973,485, filed on Oct. 26, 2004.

(51) Int. Cl.
*G06F 12/02*    (2006.01)

(52) U.S. Cl.
USPC ..... 711/173; 711/154; 711/170; 711/E12.002

(58) Field of Classification Search
USPC .......................... 711/173, 154, 170, E12.002
See application file for complete search history.

(56) References Cited

U.S. PATENT DOCUMENTS

| | | | |
|---|---|---|---|
| 6,041,395 A | 3/2000 | Beelitz | |
| 6,185,666 B1 | 2/2001 | Murray et al. | |
| 6,233,105 B1 | 5/2001 | Chen et al. | |
| 6,247,128 B1 | 6/2001 | Fisher et al. | |
| 6,298,427 B1 | 10/2001 | Beelitz | |
| 6,330,653 B1 | 12/2001 | Murray et al. | |
| 6,381,615 B2 | 4/2002 | Gaither et al. | |
| 6,453,383 B1 | 9/2002 | Stoddard et al. | |
| 2002/0157027 A1 | 10/2002 | Dayan et al. | |
| 2003/0065866 A1 | 4/2003 | Spencer | |
| 2004/0044871 A1* | 3/2004 | Weber et al. | 711/173 |
| 2004/0088692 A1 | 5/2004 | Stutton et al. | |
| 2005/0027978 A1 | 2/2005 | Neuman et al. | |

\* cited by examiner

*Primary Examiner* — Yong Choe
(74) *Attorney, Agent, or Firm* — John D. Veldhuis-Kroeze; Westman, Champlin & Koehler, P.A.

(57) ABSTRACT

An apparatus of the present invention includes partition selection circuitry configured to selectably provide individual access to multiple ones of a plurality of partitions of a data storage component by a host device without multiple partition support. The apparatus can also include the data storage component and/or the host device. The partition selection circuitry uses a logical block addressing (LBA) address generated by the host device, and an operating mode indicator indicative of a particular partition, to allow the partitions of the data storage component to be accessed by the host device without multiple partition support. Methods implemented by the apparatus are also disclosed.

19 Claims, 6 Drawing Sheets

Table 1

| Host Address | | Drive Native LBA Address |
|---|---|---|
| LBA | Partition Number (Mode) | |
| 0 | 0 | 0 |
| A0,1250 | 0 | A0,1250 |
| 0 | 1 | 0 |
| 3F,FAC4 | 1 | 3F,FAC4 |
| 0 | 2 | 3F,FAC5 |
| 3F,FAC4 | 2 | 7F,F589 |
| 0 | 3 | 7F,F58A |
| 20,1CC6 | 3 | A0,1250 |

FIG. 3-2

Table 2

| Host Address | | Drive Native LBA Address |
|---|---|---|
| LBA | Partition Number (Mode) | |
| 0 | 0 | 0 |
| A0,1250 | 0 | A0,1250 |
| 0 | 1 | 0 |
| 3F,FAC4 | 1 | 3F,FAC4 |
| 0 | 2 | 3F,FAC5 |
| 3F,FAC4 | 2 | 7F,F589 |
| 0 | 3 | 7F,F58A |
| 20,1CC6 | 3 | A0,1250 |

FIG. 4-2

METHOD AND DATA STORAGE SYSTEM FOR PROVIDING MULTIPLE PARTITION SUPPORT

CROSS-REFERENCE TO RELATED APPLICATION

The present application is a Continuation of and claims priority of U.S. patent application Ser. No. 10/973,485, filed Oct. 26, 2004, the content of which is hereby incorporated by reference in its entirety.

FIELD OF THE INVENTION

The present invention relates generally to data storage. More particularly, the invention relates to methods and apparatus which allow host devices without multiple partition support to utilize the full storage capacity of multiple partition data storage systems.

BACKGROUND OF THE INVENTION

Systems using a file allocation table (FAT) which employs 16 bits for addressing clusters of data are known as "FAT16 file systems". A FAT16 file system is limited to 2 Gbytes per partition. Storage devices with a capacity of more than 2 Gbytes, and with which a FAT16 file system is used, therefore tend to have multiple partitions, each with no more than 2 Gbytes of capacity.

The 2 Gbyte barrier of the FAT16 file system partition limit is imposed by the maximum number of clusters and the largest cluster size supported by the FAT16 file system. The FAT16 file system is limited to 65,525 clusters. The size of a cluster must be a power of 2, and be less than 65,536 bytes. This results in a maximum cluster size of 32,768 bytes (32 Kbytes). Multiplying the maximum number of clusters (65,525) by the maximum cluster size (32,768) equals 2 Gbytes.

In storage systems using multiple partitions, the first partition is typically referred to as the "primary partition." Everything not stored in the primary partition is stored in an "extended partition." A utility program, for example the "Fdisk" utility program, is used to create, delete or modify partitions on a storage system. The Fdisk utility program is a DOS utility used to configure and partition storage systems to prepare them for DOS use. The Fdisk utility software creates only one primary DOS partition (commonly referred to as "PRI DOS") on a physical disc of a disc drive data storage system. Other utility programs can also be used to create, delete or modify partitions.

Consequently, digital cameras and other host devices must use a "FAT32" file system (i.e., a file allocation table which employs 32 bits for addressing clusters of data) in order to allow reading and writing of data above the 2 Gbyte limit on an associated data storage system or device. When a host device does not support multiple partitions for FAT16, it can only access the primary partition of its associated storage device. This in turn wastes the capacity of the storage device beyond the 2 Gbyte limit.

Embodiments of the present invention provide solutions to these and/or other problems, and offer other advantages over the prior art.

SUMMARY OF THE INVENTION

An apparatus of the present invention includes partition selection circuitry configured to selectably provide individual access to multiple ones of a plurality of partitions of a data storage component by a host device without multiple partition support. The apparatus can also include the data storage component and/or the host device. The partition selection circuitry uses a logical block addressing (LBA) address generated by the host device, and an operating mode indicator indicative of a particular partition, to allow the partitions of the data storage component to be accessed by the host device without multiple partition support. Methods implemented by the apparatus are also disclosed.

Other features and benefits that characterize embodiments of the present invention will be apparent upon reading the following detailed description and review of the associated drawings.

BRIEF DESCRIPTION OF THE DRAWINGS

FIG. 3-1 is a diagrammatic illustration of a first method embodiment of the present invention, in conjunction with components of a system of the present invention.

FIG. 3-2 is a mapping table which maps combinations of LBA addresses and partition or mode numbers to a storage component's native LBA addresses.

FIG. 4-1 is a diagrammatic illustration of a second method embodiment of the present invention, in conjunction with components of a system of the present invention.

FIG. 4-2 is a translation table which demonstrates how the translation engine shown in FIG. 4-1 translates LBA addresses and partition numbers into native LBA addresses.

DETAILED DESCRIPTION OF ILLUSTRATIVE EMBODIMENTS

Figure 1:
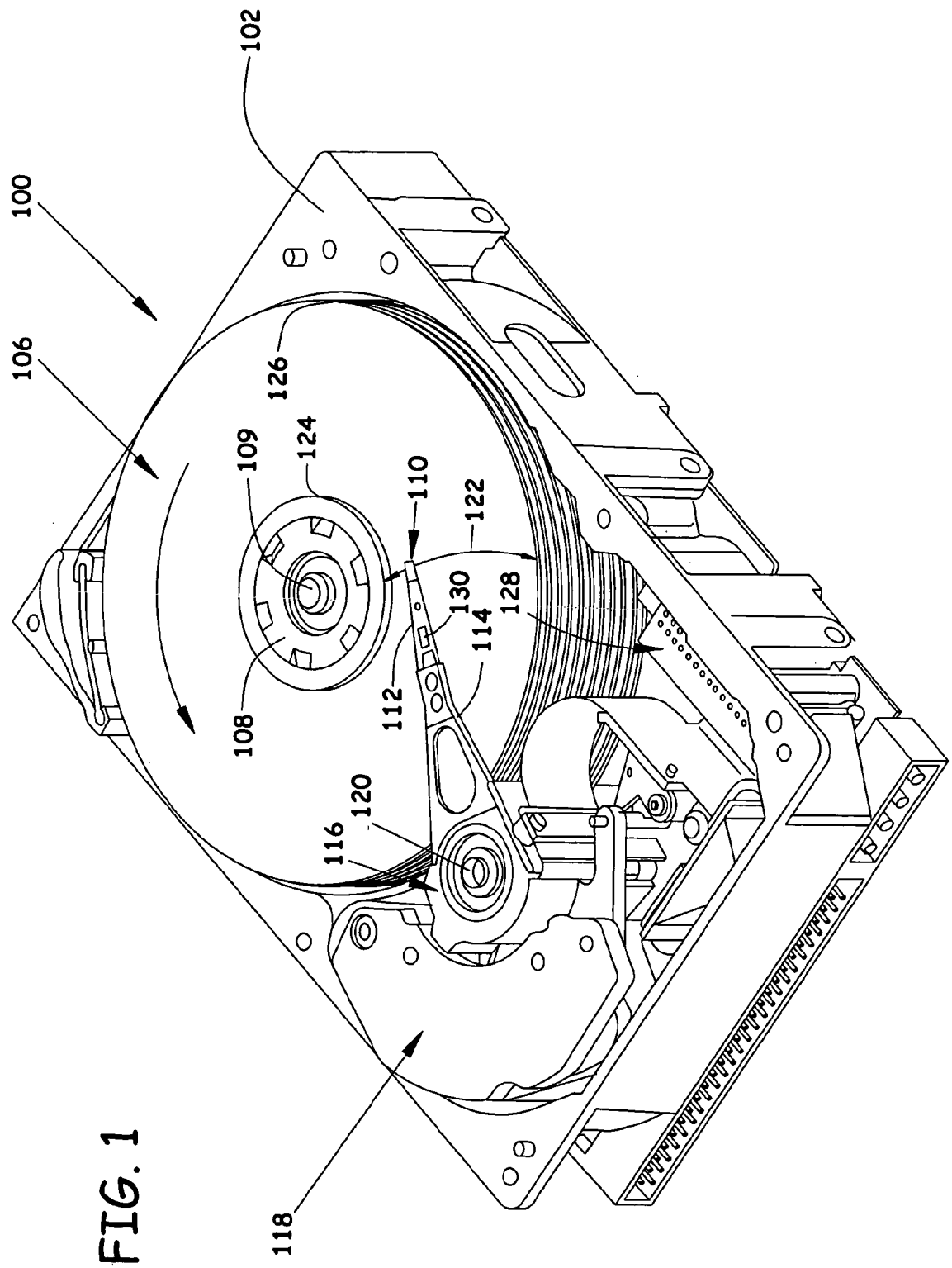
FIG. 1 is an isometric view of a disc drive type data storage system.

FIG. 1 is an isometric view of a disc drive 100 with which embodiments of the present invention are useful. Disc drive 100 represent a data storage device or component which can be partitioned and accessed by a host device. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

While a particular disc drive is shown, disc drive 100 is intended to represent any of a variety of data storage devices or components in which, or with which, the methods and apparatus of the present invention can be implemented. For example, in other embodiments, disc drive 100 can be other types of magnetic disc drives, or can be other types of non-magnetic disc drives such as an optical disc drive, a magneto-optical disc drive, etc.

Figures 1, 2:
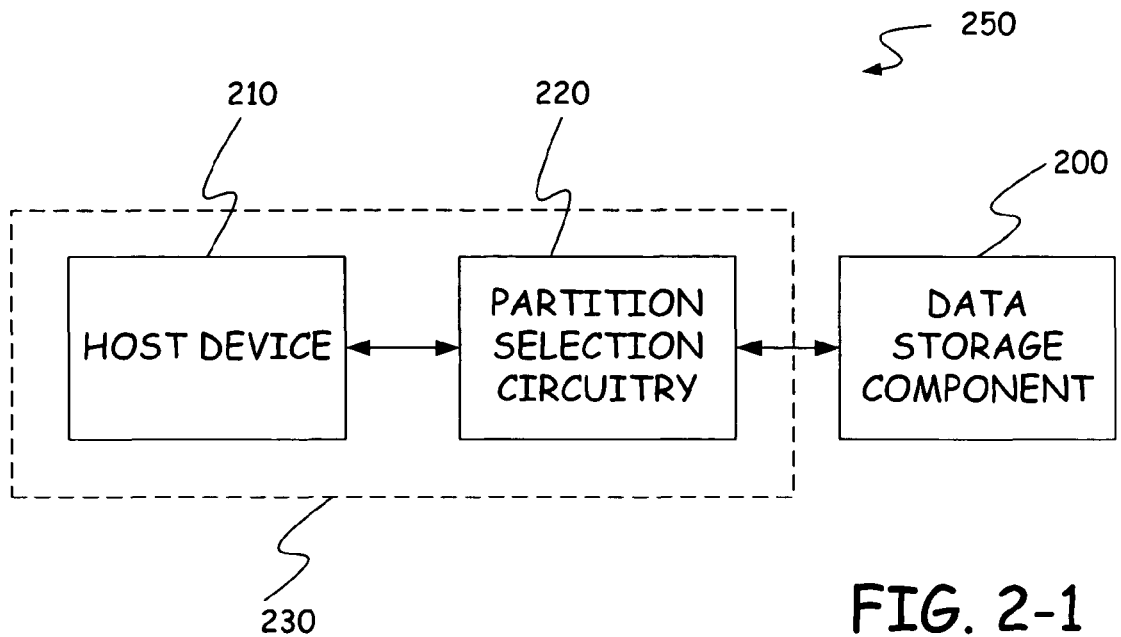
FIGS. 2 and 3 are block diagrams illustrating systems, apparatus and components in which the present invention can be embodied.
Figure 2:
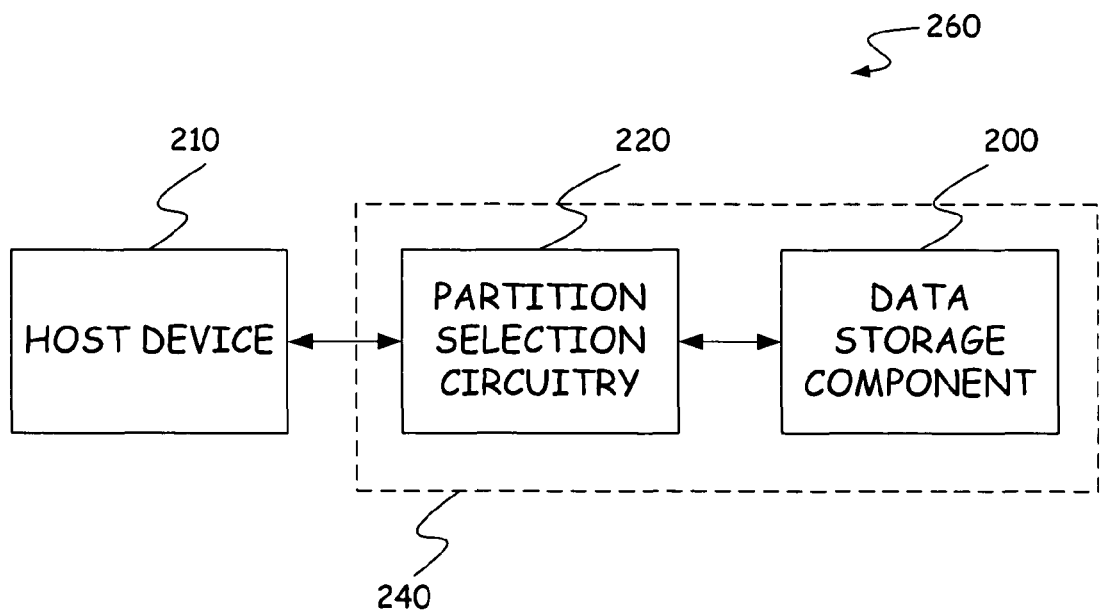

Referring now to FIGS. 2-1 and 2-2, shown are alternative embodiments of systems in accordance with some embodiments of the present invention. In FIG. 2-1, system 250 includes a host device 210 and a data storage device or component 200. In an example embodiment, host device 210 represents any type of host device with a legacy FAT16 file systems (i.e., without multiple partition support). However, the present invention is not limited to host devices with FAT16 file systems, but instead is extendible, for example for use with any host device without multiple partition support. Data storage component 200 is a data storage system or device, such as disc drive 100, having a data storage capacity in excess of the maximum partition size with which the host device is configured to work. In the example of a host device with a legacy FAT16 file system, data storage component 200 has a capacity in excess of the 2 Gbyte per partition limit described above. As will be described below in greater detail, data storage component 200 is configured to provide multiple partitions.

Partition selection circuitry 220 of system 250 can include hardware and/or software switches or other components or modules which are used to selectably provide to host device 210 individual access to multiple ones of the partitions of data storage component 200. Partition selection circuitry 220, and related methods of the present invention, are described below particularly with reference to FIGS. 3-1, 3-2, 4-1, 4-2 and 5.

In various embodiments, partition selection circuitry 220 can be implemented independently, with the host device, or with the data storage component. For example, in FIG. 2-1, dashed lines surrounding host device 210 and partition selection circuitry 220 represent that these components can be combined into a single system or apparatus 230. In contrast, in FIG. 2-2, dashed lines surrounding data storage component 200 and partition selection circuitry 220 represent that these components can be combined into a single system or apparatus 240 of a larger system 260.

The present invention includes methods, and corresponding apparatus, which allow host devices with legacy FAT16 file systems (i.e., without multiple partition support) to utilize the full storage capacity of a disc drive or other data storage device. These methods can be implemented, for example, in the various components and apparatus illustrated in FIGS. 2-1 and 2-2. In exemplary embodiments of these methods, the capacity of the data storage device is divided into multiple partitions, each of which cannot exceed 2 Gbytes in size. Partition selection circuitry, for example in the form of software and/or hardware switches, allows a user of the host device and data storage device to switch between the different partitions. Software switches can be embodied in suitably programmed processing circuitry. Hardware switches can be jumpers (i.e., jumper settings) or dipswitches which can be manipulated by the user to set the mode of operation in the manner described below. Other types of hardware switches can be used as well. Hardware switches provide the advantage, relative to software switches, of not requiring the data storage device to be programmed before switching between different partitions. Software switches provide the advantage, relative to hardware switches, of not requiring extra hardware. Further, in one particular example embodiment, the number of jumpers/dipswitches used limits the number of partitions which can be supported. This is not true for software switches.

Using the methods and apparatus of the present invention, to access the partitions of the data storage device, the host device (and/or the user) must provide both the logical block addressing (LBA) address and an operating mode indicator (for example through switches) which represents the partition number to be accessed. If the operating mode indicator or partition number is not specified, then a default partition is assumed. Two embodiments of the methods and apparatus of the present invention are described below with reference to FIGS. 3-1 and 4-1, with the two embodiments differing in the manner that the partitions are addressed and formatted.

Figures 1, 3:
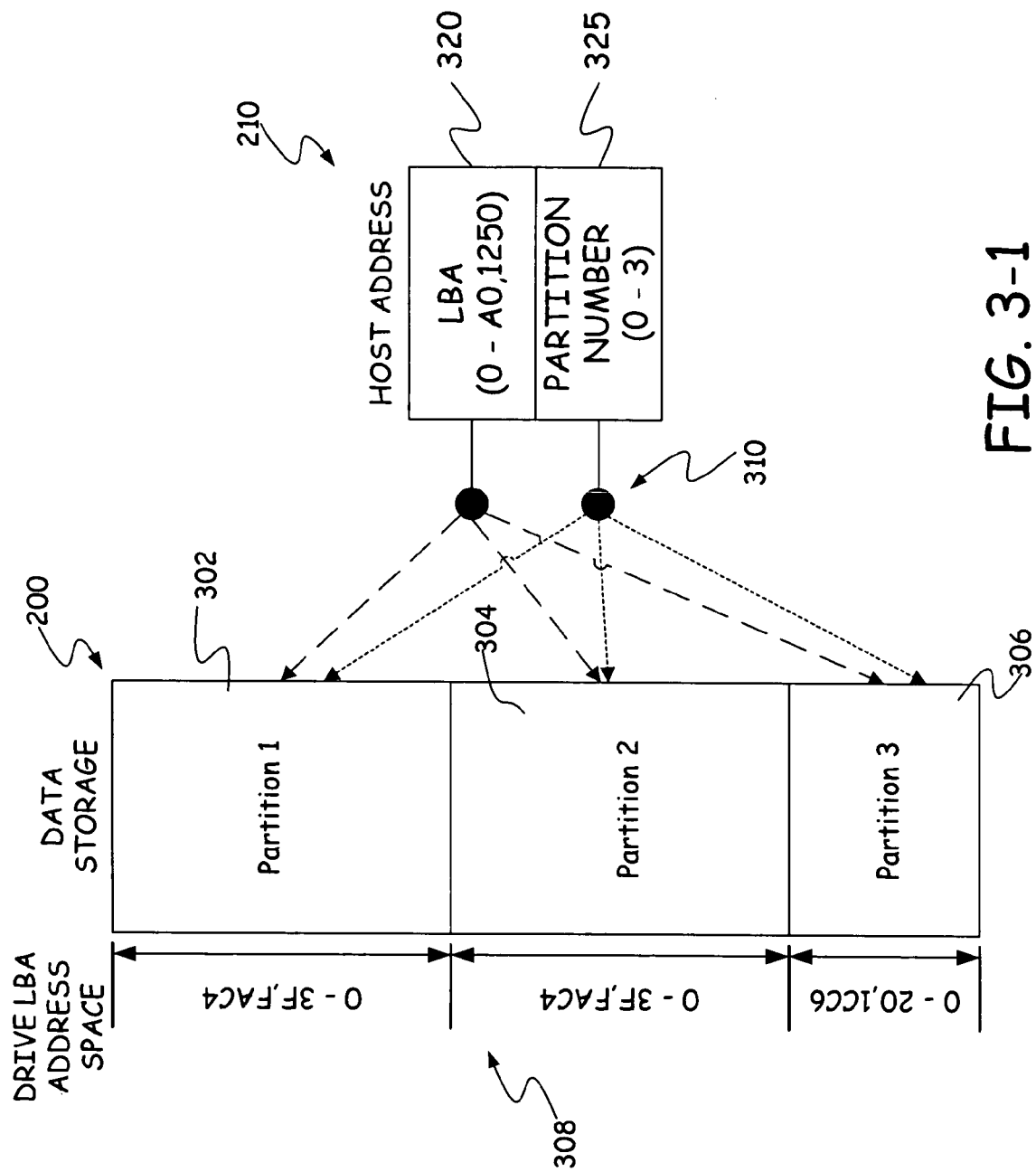

Referring now to FIG. 3-1, a first method embodiment is diagrammatically illustrated in conjunction with corresponding components of a host device, partition selection circuitry, and a data storage component. Using this first method embodiment, the disc drive or other data storage component treats each partition as an independent storage unit. All partitions share the same partition LBA address space (as opposed to the "native" LBA address space of the storage component), as is illustrated in FIG. 3-1. In the illustrated example, assume that storage component or device 200 with a capacity of 5 Gbytes is used. It is divided into three partitions which are less than the 2 Gbyte limit, partition 1 (reference number 302), partition 2 (reference number 304) and partition 3 (reference number 306). A fourth partition, partition 0 (reference number 308), includes the entire 5 Gbytes of the data storage component.

The partition LBA address space of the smaller partitions is 0 to 0x3FFAC4 (partition 1), 0 to 0x3FFAC4 (partition 2), and 0 to 0x201CC6 (partition 3), respectively, as is shown in FIG. 3-1. Table 1 shown in FIG. 3-2 is a mapping table which maps combinations of host generated LBA addresses (for a FAT16 system) and partition or mode numbers to the storage component's native LBA addresses. If host device 210 has a legacy FAT16 file system, the host generated LBA address can range from 0-3F,FAC4. If the host device has a different FAT files system (for example a FAT32 file system), the host generated LBA address can have a different range (for example the illustrated 0-A0,1250). All three partitions 302/304/306 are formatted as the primary partition, as at any one time there is only one single partition accessible when switching between the three. The LBA address space for the single larger partition (partition 0), encompassing the three smaller partitions, is in this particular example 0 to A0,1250.

A software/hardware switch 310 allows the user/host device to switch between the different partitions 302/304/306 of the data storage component. This limits drive capacity to 5, 2, 2 and 1 Gbyte when switching between partitions 0 through 3, respectively. The software/hardware switch 310 forms at least a portion of partition selection circuitry 220 shown in FIGS. 2-1 and 2-2. Before the host device 210 accesses the data storage component, it (or the user) must program or switch the partition number. Otherwise, partition 0, the full capacity of the data storage component from LBA 0 to 0xA0, 1250 will always be assumed. Thereafter, the host device provides the LBA address and this same LBA address will be used to access the data sector with the specific (or default) partition.

In some embodiments, the LBA address is provided by address generating circuitry, modules or components 320 of host device 210. Similarly, the mode or partition number can be provided by partition designating circuitry, modules or components 325 of host device 210. In other embodiments, the partition number is provided to the storage component 200 by the user through switches 310, for example in the form of jumper settings. In any event, switches 310 use the partition number to determine which partition of component 200 that the provided LBA address corresponds to. As mentioned above, while circuitry 320 shown in FIG. 3-1 is illustrated as generating an LBA address of between 0 and A0,1250 (i.e., for a FAT32 system), for a FAT16 system the LBA addresses generated by the host device will be between 0 and 3F,FAC4.

Figures 1, 4:
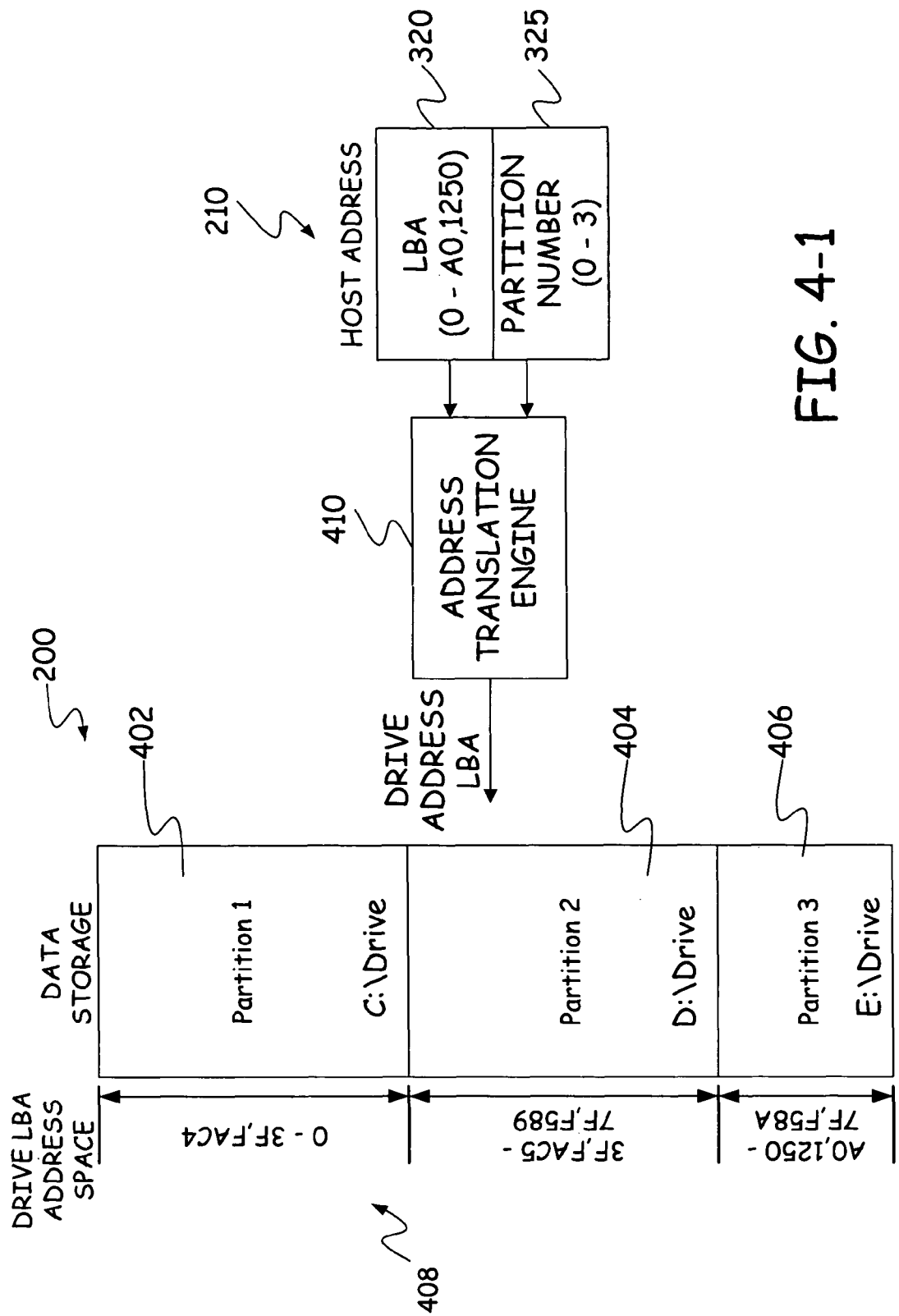

Referring now to FIG. 4-1, a second method embodiment is diagrammatically illustrated in conjunction with corresponding components of a host device, partition selection circuitry, and a data storage component. In this example, the data storage component 200 again has a capacity of 5 Gbytes. Using this method embodiment, the data storage component 200 is still divided into three partitions which are each less than the 2 Gbyte limit, but with each partition having different partition LBA address spaces, and the address spaces from one partition to the next being continuous. In FIG. 4-1, the three partitions are illustrated as partition 1 (reference number 402), partition 2 (reference number 404) and partition 3 (reference number 406). Overall, the three partitions span an address space from 0 to 0xA01250. The address spaces of these three partitions are illustrated in FIG. 4-1.

In this embodiment, instead of switches being used, an address translation engine 410 accepts the host device generated LBA address and partition number (for example through switches) from host device 210 (and/or from the user in the case of the partition number in some embodiments), and converts them into a drive native LBA address. The translation engine forms, in some embodiments, at least a portion of partition selection circuitry 220 shown in FIGS. 2-1 and 2-2. In exemplary embodiments, translation engine 410 is integrated or included with data storage component 200. However, in other embodiments, translation engine 410 is separate from the data storage component. In the illustrated example, the first 2 Gbyte partition 402 is formatted as the primary partition, and the other partitions (i.e., 404 and 406) are formatted as extended partitions with individual logic volume. Other drive configurations can also be used, such as formatting the 5 Gbyte storage component into five partitions with 1 Gbyte size each.

Table 2 shown in FIG. 4-2 is a translation table which demonstrates how the translation engine 410 translates host generated LBA addresses, and partition numbers, into native LBA addresses. Again, if the partition number is not specified, the default mode 0 (partition 0 represented at 408) corresponding to the entire 5 Gbytes of the data storage component 200 is assumed by translation engine 410. When a partition other than partition 0 is specified, translation engine 410 translates the host generated LBA address and partition number into a native LBA address to allow access by the host device 210 to the corresponding partition or partition extension. For example, when mode 2 (partition 2 represented at 404) is chosen, the first partition of the extended partition of data storage component 200 is accessible by host device 210. All LBA addresses generated by the host device are therefore offset by address translation engine 410 by the size of the first or primary partition 402, which in this example is 0x3FFAC5. This can be computed using the first partition table information available in the primary Master Boot Record (MBR). The capacity of the storage device will be capped by the size of the currently selected partition, which can be found in the first partition table information in the extended MBR (at 0x3FFAC5). This avoids reading/writing beyond the partition capacity.

The two method embodiments described above with reference to FIGS. 3-1, 3-2, 4-1 and 4-2 provide little difference for host devices, such as digital cameras or other electronic devices, which use FAT16 file systems without multiple partition support. Using either method embodiment, and the corresponding apparatus described above, the data storage component will appear to the host to be a single 2 Gbyte (maximum) storage device.

Using the first method and apparatus embodiments (e.g., FIG. 3-1), all partitions are formatted as the primary partition. One issue which arises using this method is that once the storage is reset to the default configuration (mode or partition 0 in this example), only the default partition is accessible, even for host devices which support multiple partitions. Examples of host devices which are likely to have multiple partition support include personal digital (or data) assistants (PDAs) and personal computers (PCs). Thus, the first method embodiment can result in certain inconveniences in some practical applications. For example, consider the case of the data storage component being used with a digital camera (or other host device) without multiple partition support, with the second 2 Gbyte partition (partition 2) being selected. Assume further that once reading/writing is completed, the data storage component is reset to the default configuration and plugged into a PDA, a PC or other host device for further processing. Since the data is stored in the second partition, but the other host device sees only the default partition, extra steps may be necessary to retrieve the data.

Using the second method and apparatus embodiments (e.g., FIG. 4-1), it is possible to provide hosts with multiple partition support for FAT16 file systems, such that they can access all partitions as individual logical devices. To this end, the drive is formatted into two main partitions. The first 2 Gbyte partition is formatted as the primary partition and the rest of the capacity as the extended partition. The extended partition is further divided into more partitions, each with a maximum size of 2 Gbyte, if the overall extended partition capacity is still greater than 2 Gbyte. This method allows the full capacity of the storage device to be used in a single partition environment, and yet allows it to be used in a multiple partition support device as well. With this method, the above-described inconvenience related to retrieving data can be overcome.

Figure 5:
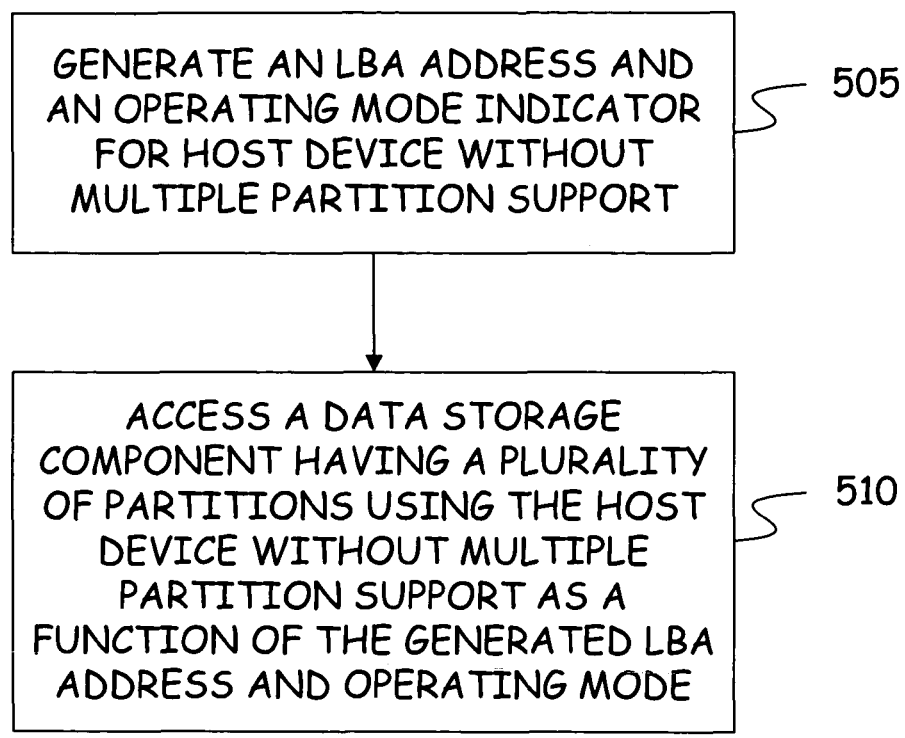
FIG. 5 is a flow diagram illustrating a general method of the present invention.

Referring now to FIG. 5, shown is a flow diagram illustrating a general method in accordance with the present invention as described above. At block 505, the method is shown to include the step of generating a logical block addressing (LBA) address and an operating mode indicator for a host device without multiple partition support. Then, at block 510, the method includes the step of accessing a data storage component having a plurality of partitions using the host device without multiple partition support as a function of the generated LBA address and operating mode. The operating mode can be a partition number or a designator indicative of a partition number. In the method, the step of generating the LBA address and the operating mode indicator for the host device can include generating the LBA address and the operating mode for a host device having a FAT16 file system.

In one embodiment, the step of accessing the data storage unit as a function of the generated LBA address and the operating mode further includes selecting one of the plurality of partitions based upon the operating mode, and accessing the selected one of the plurality of partitions using the generated LBA address. In another embodiment, the step of accessing the data storage unit as a function of the generated LBA address and the operating mode further includes translating the generated LBA address and the operating mode into a native LBA address for the data storage component, and accessing the selected one of the plurality of partitions using the native LBA address.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage components, while maintaining substantially the same functionality without departing from the scope and spirit of the present invention. In addition, although embodiments described herein are directed toward use in, or with, a disc drive data storage system, it will be appreciated by those skilled in the art that the teachings of the present invention can be applied to other data storages systems and components without departing from the scope and spirit of the present invention.

What is claimed is:

1. An apparatus comprising:
   a data storage component configured to provide a plurality of partitions; and
   partition selection circuitry configured to selectably provide individual access to multiple ones of the plurality of partitions of the data storage component, by a host device which does not support multiple partitions, as a function of a logical block addressing (LBA) address and a mode indicator generated by the host device.

2. The apparatus of claim 1, wherein the plurality of partitions of the data storage component share same LBA address spaces.

3. The apparatus of claim 2, wherein the partition selection circuitry includes a switch configured to selectably provide the individual access to the multiple ones of the plurality of partitions of the data storage component as a function of the mode indicator, and as a function of the LBA address generated by the host device.

4. The apparatus of claim 3, wherein the mode indicator is a partition number.

5. The apparatus of claim 3, wherein the switch is a hardware switch.

6. The apparatus of claim 3, wherein the switch is a software switch.

7. The apparatus of claim 1, wherein the plurality of partitions of the data storage component have different reference LBA address spaces.

8. The apparatus of claim 7, wherein the partition selection circuitry includes an address translation engine configured to translate a partition number, and a LBA address generated by the host device, into a native LBA address, and to selectably provide access to the partitions of the data storage component based upon the native LBA address.

9. The apparatus of claim 1, wherein the partition selection circuitry and the data storage component are embodied in a data storage apparatus.

10. The apparatus of claim 9, wherein the data storage apparatus is a disc drive data storage apparatus.

11. The apparatus of claim 1, wherein the plurality of partitions of the data storage component are each formatted as primary partitions and share same reference LBA address spaces.

12. The apparatus of claim 1, wherein the plurality of partitions of the data storage component have different LBA address spaces, with one of the plurality of partitions formatted as a primary partition and remaining partitions being formatted as extended partitions.

13. An apparatus comprising:
   partition selection circuitry configured to selectably provide individual access to multiple ones of a plurality of partitions of a data storage component, as a function of a mode indicator, by a host device which does not support multiple partitions, wherein the partition selection circuitry includes a switch configured to selectably provide the individual access to the multiple ones of the plurality of partitions of the data storage component as a function of a logical block addressing (LBA) address and as a function of the mode indicator.

14. An apparatus comprising:
   partition selection circuitry configured to selectably provide individual access to multiple ones of a plurality of partitions of a data component, as a function of a mode indicator, by a host device which does not support multiple partitions, wherein the mode indicator is a partition number and wherein the partition selection circuitry includes an address translation engine configured to translate a logical block addressing (LBA) address and the partition number into a native LBA address, and to selectably provide access to the partitions of the data storage component based upon the native LBA address.

15. A method comprising:
   generating a logical block addressing (LBA) address and an operating mode indicator for a host device which does not support multiple partitions;
   accessing a data storage component having a plurality of partitions, using the host device which does not support multiple partitions, as a function of the generated LBA address and operating mode.

16. The method of claim 15, wherein generating the operating mode for the host device which does not support multiple partitions further comprises generating a partition number.

17. The method of claim 15, wherein generating the LBA address and the operating mode indicator for the host device which does not support multiple partitions further comprises generating the LBA address and the operating mode for a host device having a FAT16 file system.

18. The method of claim 15, wherein accessing the data storage unit as a function of the generated LBA address and the operating mode further comprises:
   selecting one of the plurality of partitions based upon the operating mode; and
   accessing the selected one of the plurality of partitions using the generated LBA address.

19. The method of claim 15, wherein accessing the data storage unit as a function of the generated LBA address and the operating mode further comprises:
   translating the generated LBA address and the operating mode into a native LBA address for the data storage component; and
   accessing the selected one of the plurality of partitions using the native LBA address.

* * * * *